(12) United States Patent
Dawes

(10) Patent No.: X6502
(45) Date of Patent: Apr. 21, 1831

(54) TANNING LEATHER

(76) Inventor: Isaac Dawes

Isaac Dawes, Goshen farm Maryland

Letters Patent.

The Schedule referred to in these Letters Patent and making part of the same, containing a description in the words of the said Isaac Dawes himself of his improvement in Tanning.

Be it known that I, Isaac Dawes, living on Goshen Farm Montgomery County, and State of Maryland have made an improvement in Tanning; which is described as follows:—

The skins to be tanned are limed in the usual way. When limed, they are haired and fleshed as usual; they are then hung in the vats upon pegs or nails as close as they can be put without pressing on each other and there to remain till they are fit to work in the bark. They are then to be clean worked out and rinsed in water; then being in the tan vats upon pegs or nails, as before described in weak sour liquor for two or three days. They are then to be removed into a stronger liquor and hung on pegs or nails as before, there to remain four or five days.—

Then make a very strong liquor of Black oak bark into which introduce one pound of Glauber or other salts for a vat of about thirty hides, also add about 3 bushels of bark at the bottom of the vat and one on the top; into this vat hang the hides as before mentioned, there let them remain about three weeks; likewise lay from 3 & 4 sides on the top of the vat to prevent the strength of the liquor from evaporating.

The vats to be covered with boards or doors

When the hides are removed the different vats can be used as weak liquors for the next hides to be tanned.

What I claim as my invention is the before described method of tanning leather, by which it can be tanned in much less time, less labour and is equally good with that tanned by the usual mode.

In witness whereof I have hereunto subscribed my name before two witnesses and made affirmation to the same this 16th day of April 1801.

Witnesses
W. D. Elliot
Robt Clarke

Isaac Davey.

[illegible]

[illegible] (Drawing Not Required)